United States Patent
Tsuzuki

(10) Patent No.: US 7,368,893 B2
(45) Date of Patent: May 6, 2008

(54) VOLTAGE CONTROL APPARATUS FOR ELECTRIC GENERATOR OF VEHICLE

(75) Inventor: Tomomi Tsuzuki, Toyota (JP)

(73) Assignee: Denso Corporation, Kariya (JP)

( * ) Notice: Subject to any disclaimer, the term of this patent is extended or adjusted under 35 U.S.C. 154(b) by 57 days.

(21) Appl. No.: 11/517,289

(22) Filed: Sep. 8, 2006

(65) Prior Publication Data

US 2007/0057648 A1 Mar. 15, 2007

(30) Foreign Application Priority Data

Sep. 9, 2005 (JP) ............................. 2005-261459

(51) Int. Cl.
*H02P 9/00* (2006.01)
*H02J 7/14* (2006.01)

(52) U.S. Cl. ........................................ 322/28; 322/37
(58) Field of Classification Search .................. 322/25, 322/27, 28, 37, 59
See application file for complete search history.

(56) References Cited

U.S. PATENT DOCUMENTS

| 4,689,545 A * | 8/1987 | Komurasaki et al. ......... 322/14 |
| 4,839,576 A * | 6/1989 | Kaneyuki et al. ............. 322/25 |
| 4,937,514 A * | 6/1990 | Iwatani ........................ 322/33 |
| 5,144,220 A | 9/1992 | Iwatani et al. |
| 5,491,400 A * | 2/1996 | Iwatani et al. ................ 322/28 |
| 5,581,172 A * | 12/1996 | Iwatani et al. ................ 322/28 |
| 6,137,247 A * | 10/2000 | Maehara et al. ............ 318/140 |
| 6,344,734 B1 * | 2/2002 | Iwatani et al. ................ 322/28 |
| 6,700,355 B2 * | 3/2004 | Aoyama et al. .............. 322/36 |
| 6,756,761 B2 * | 6/2004 | Takahashi et al. .......... 318/599 |
| 6,812,675 B2 * | 11/2004 | Okamoto et al. ............. 322/28 |
| 7,253,591 B2 * | 8/2007 | Takahashi .................... 322/59 |
| 7,285,938 B2 * | 10/2007 | Aoyama ....................... 322/28 |
| 7,292,007 B2 * | 11/2007 | Aoyama ....................... 322/24 |

FOREIGN PATENT DOCUMENTS

| JP | A 63-92232 | 4/1988 |
| JP | A 3-173324 | 7/1991 |

* cited by examiner

Primary Examiner—Nicholas Ponomarenko
(74) Attorney, Agent, or Firm—Oliff & Berridge, PLC

(57) ABSTRACT

In a vehicle voltage control apparatus which regulates the output voltage of the vehicle electric generator and which receives an external control signal for lowering the regulated voltage value, from an external apparatus such as the engine ECU during engine starting, a circuit detects the occurrence of engine starting based upon the frequency of an AC voltage produced by the generator or upon the level of output voltage produced by the generator. The regulated voltage value is set to a substantially low level, predetermined for use during engine starting, only while the control signal is being received concurrent with engine starting also being detected.

8 Claims, 2 Drawing Sheets

VOLTAGE CONTROL APPARATUS FOR ELECTRIC GENERATOR OF VEHICLE

CROSS-REFERENCE TO RELATED APPLICATIONS

This application is based on and incorporates herein by reference Japanese Patent Application No. 2005-261459 filed on Sep. 9, 2005.

BACKGROUND OF THE INVENTION

1. Field of Application

The present invention relates to a voltage control apparatus for installation on a motor vehicle such as an automobile, truck, etc.

2. Description of Related Art

The electric generator of a motor vehicle is generally a combination of an AC generator apparatus that is driven from the vehicle engine, and a rectifier apparatus, with the electric generator thereby producing a DC voltage which is supplied to charge the vehicle battery and to drive various electrical loads of the vehicle. The higher the level of output current that must be supplied to charge the battery and to drive the electrical loads, the greater will be the level of torque that must be applied from the engine to the rotor of the electric generator (i.e., of the AC generator apparatus). In recent years, there has been a trend towards increasing the amount of electrical equipment installed on a motor vehicle, so that that total load that must be supplied by the electric generator is increasing accordingly.

However if the level of torque that must be applied to the electric generator from the engine becomes excessive, then this can result in instability of engine starting. For that reason, it has been proposed to lower the value of output voltage of the electric generator during engine starting. In that way, the level of output power supplied by the electric generator is reduced, so that the torque load on the engine is correspondingly lowered during the engine starting.

A method of performing this, using the voltage control apparatus of the vehicle (generally referred to as the voltage regulator of the generator) to reduce the output voltage of the electric generator during a predetermined interval while engine starting is being performed, is described in Japanese patent publication No. 3-173324 (pages 2-4, FIGS. 1,2), referred to in the following as reference document 1. Similarly, with a method described in Japanese patent publication No. 63-92232 (pages 2-4, FIGS. 1-3), referred to in the following as reference document 2, an ECU (electronic control unit) temporarily lowers the voltage to which the electric generator output is regulated, while such lowering is judged to be required during engine starting. In the following, such temporary lowering of the electric generator output voltage during some specific operating condition of the vehicle engine will be referred to as "restraining" the electric generator output voltage.

With the method of reference document 1 above, due to the fact that restraint of the electric generator output voltage is performed during a fixed interval that occurs during engine starting, with the fixed time interval being determined by a timer, etc., the same degree and duration of restraint of the generator output voltage will be applied irrespective of the level of electrical load that is being supplied from the electric generator. Hence, even if that electrical load is small, restraint of the generator output voltage will be applied when it is not actually necessary. As a result, if the duration of each fixed interval of restraint of the generator output voltage is long, thereby reducing the amount of charging current that is supplied to the vehicle battery, then the level of charge in the battery may become excessively low.

With the method of reference document 2 above, which changes the regulated output voltage value of the electric generator to a different value during engine starting, by a control signal supplied to the electric generator control circuit from an external apparatus (i.e., engine ECU), it can be ensured that restraint of the generator output voltage will be performed during engine starting only when it is actually necessary. However during engine starting in cold weather, the terminal voltage of the battery (during normal operation of the electric generator) may be greatly reduced. In such a condition, the necessary degree of restraint of the generator output voltage (to achieve a required improvement in engine starting performance) cannot be achieved by applying only a small reduction in the regulated value of the generator output voltage.

That problem could be alleviated, to achieve improved engine starting performance during cold weather operation, by applying a substantial lowering of the regulated value of the generator output voltage, to effect restraint of the generator output voltage during engine starting. However in that case there is a danger that the regulated value of the generator output voltage might become fixed at the very low value, as a result of some abnormality occurring in the connecting leads or connection terminals that transfer the control signal from the ECU. In such a case, almost no generator power would be produced by the electric generator, so that serious problems in operating the vehicle could arise, with the battery becoming completely discharged.

Hence with such a method, it is not practicable to set the regulated value of the generator output voltage at a very low value.

SUMMARY OF THE INVENTION

It is an objective of the present invention to overcome the above problems, by providing a vehicle control apparatus for an electric generator of a vehicle, whereby the engine starting performance can be enhanced for various different conditions of operating the vehicle, and whereby restraint of the generator output voltage is applied only when necessary and is applied to an appropriate degree.

To achieve the above objectives, according to a first aspect the invention provides a voltage control apparatus for installation on a motor vehicle having an electric generator that is driven by the vehicle engine of the vehicle and a battery which is charged by the generator output, with the voltage control apparatus comprising voltage control means for maintaining an output voltage of the electric generator or a terminal voltage of the battery at a regulated voltage, and with the voltage control apparatus receiving an external control signal that is transmitted from an external control apparatus (such as the engine ECU) for designating that generator output restraint is to be applied by making the regulated voltage lower than a first regulated value that is applied during normal running of the engine. The voltage control apparatus comprises engine starting judgement means for detecting each occurrence of engine starting, external signal judgement means for detecting when the external control signal is being received, and regulated voltage changeover means. The regulated voltage changeover means:

(a) changes the regulated voltage from the first regulated value to a second regulated value that is lower than the first regulated value, when the external signal judgement means detects that the external control signal is being received, and (b) changes the regulated voltage to a third regulated value that is lower than the second regulated value, when the external signal judgement means detects that the external control signal is being received and also the engine starting judgement means concurrently detects that engine starting is occurring.

Since the regulated value of electric generator output voltage can be set to the extremely low third value in response to a control signal transmitted from the external apparatus (which will typically be the engine ECU), and it can be ensured that this can only occur during engine starting, an improvement can be achieved in the engine starting performance during various conditions of operating the vehicle, including low-temperature operation. Furthermore even if the some abnormality occurs in the connecting leads or connection terminals that transfer the control signal from the external apparatus, causing a control input to be continuously supplied at the potential of the control signal (or if some other failure condition occurs that has the same effect), the invention ensures that the regulated value of electric generator output voltage will only be set at the extremely low level during each interval in which engine starting is in progress. Thus it can be ensured that occasions of extreme lowering of the electric generator output voltage will (in the worst-case condition) only occur for occasional very short intervals.

The invention thus ensures that the condition of setting the output voltage of the electric generator to a very low level is performed only when actually necessary, irrespective of connection conditions to the external apparatus.

The engine starting judgement means preferably detects occurrence of engine starting by judging whether the speed of rotation of the rotor of the electric generator is lower than a predetermined value. In general, such an electric generator incorporates an AC generator that is directly driven (e.g., by pulleys and a drive belt) from the engine. Thus, the engine starting judgement means can advantageously detect that speed of rotation, and hence judge the speed of rotation of the engine, based on detecting the frequency of the AC voltage produced by the AC generator.

In that way, occurrence of engine starting can be accurately and reliably detected, since there is a fixed relationship between that speed of rotation and the engine speed of rotation, with the generator speed of rotation being equal to the engine speed of rotation multiplied by the pulley ratio of the pulleys that drive the electric generator from the engine.

Alternatively, the engine starting judgement means can be configured to detect an engine starting interval as beginning that the point when rotation begins to be detected as described above, and as ending when the output voltage of the electric generator attains a predetermined value. That value can for example be substantially equal to the aforementioned first regulated value that can be selected by the regulated voltage changeover means for use during normal running of the engine.

Such a system may be advantageously configured such that, after the control signal from the external apparatus has caused the generator voltage control apparatus to regulate its output voltage to the lowest value for a certain duration (e.g., after the external control apparatus determines that driving of the engine starter motor has halted), the supplying of the external control signal is thereafter successively interrupted, so that the target value of generator output voltage is successively switched between the lowest value and the normal operating value. By performing this on/off switching of the external control signal in a suitable time axis pattern, the electric generator output voltage can be gradually increased from the lowest value to the normal value. A smooth transition can thereby be achieved between the condition of the electric generator output voltage being at the extremely low value and the attainment of a normal operating level for that output voltage.

From another aspect, such a voltage control apparatus can be configured such that, after the engine starting judgement means has detected commencement of generator rotation and the external signal judgement means judges that the external control signal is being received at that time, the regulated voltage changeover means subsequently terminates the setting of the regulated voltage to the third regulated value when the external control signal ceases to be received, irrespective of the detection status of the engine starting judgement means.

In that way, the duration of each interval for which the output voltage of the electric generator is regulated to a very low value during engine starting can be arbitrarily set by an external apparatus, such as the engine ECU, and so can be freely adjusted to an optimum value in accordance with the operating condition of the engine and the electrical load on the generator at that time.

DESCRIPTION OF PREFERRED EMBODIMENTS

First Embodiment

Figure 1:
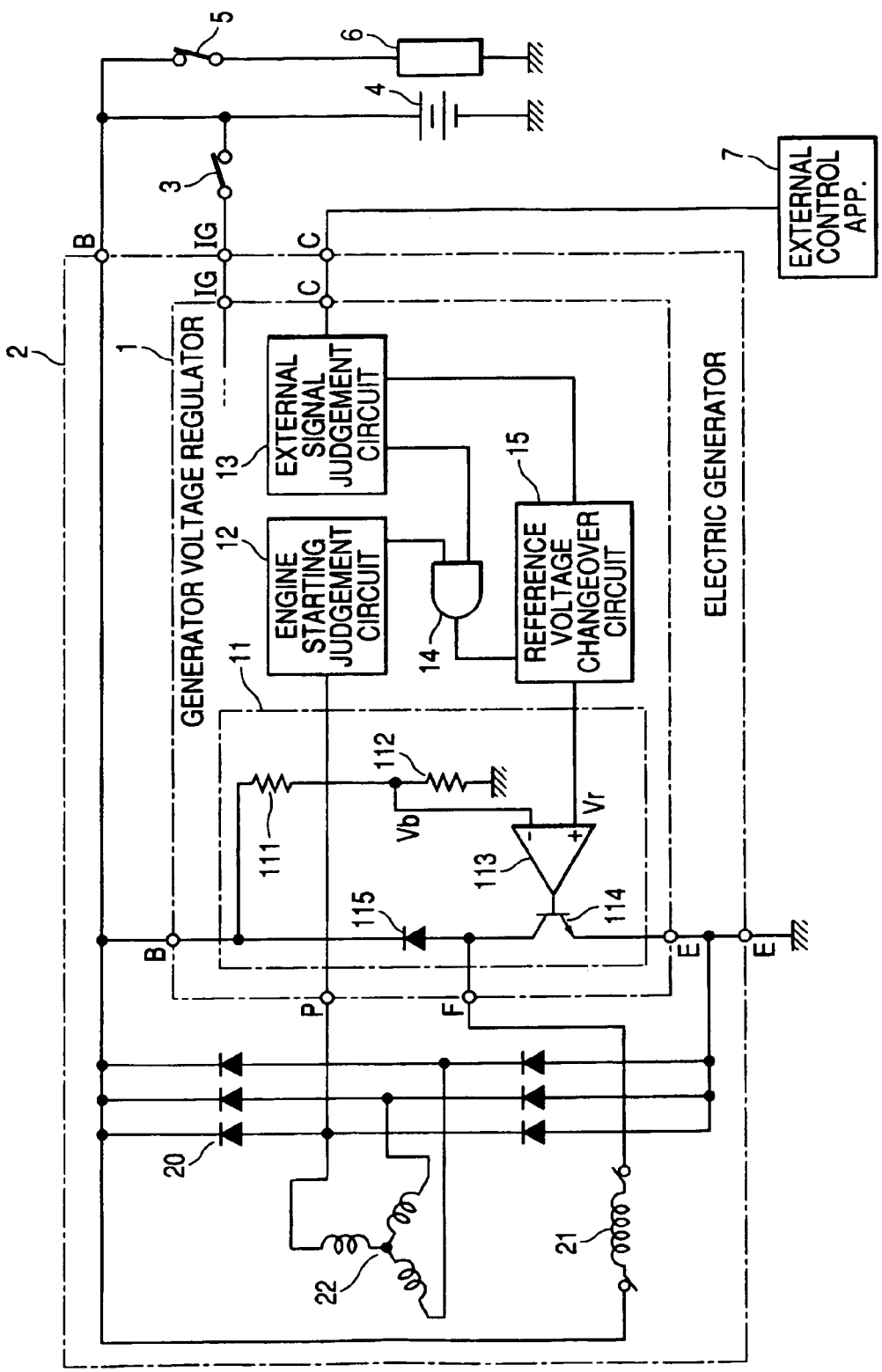
FIG. 1 shows the general configuration of a first embodiment of a generator voltage regulator for a motor vehicle.

FIG. 1 shows the general configuration of a first embodiment of a generator voltage regulator 1 incorporated in an electric generator 2 of a vehicle. FIG. 1 also shows the connections between the electric generator 2 and an external apparatus 7, such as an engine ECU of the vehicle.

The electric generator 2 is based on a 3-phase AC generator which is driven by a drive belt and pulleys from the vehicle engine, with only the field winding 21 and armature winding 22 of that AC generator being shown, and a full-wave rectifier 20 which converts the AC output voltage from the AC generator to an unsmoothed DC voltage that is supplied to an output terminal (B terminal) of the electric generator 2.

The field winding 21 is formed on the poles of the rotor (not shown in the drawings) of the AC generator, while the armature winding 22 is a 3-phase wave-wound coil that is formed on the iron core of the armature (not shown in the drawings) of the AC generator. As is well known, the level of output voltage generated by such an AC generator (and hence the level of output voltage appearing at the B terminal of the electric generator 2) is determined by the speed of rotation of the generator rotor and the level of excitation current passed through the field winding 21. That level of excitation current is controlled by the generator voltage regulator 1.

In addition to being supplied to various equipment of the vehicle (indicated as the electrical load 6) via a switch 5, the output voltage from the B terminal of the electric generator 2 is supplied to the battery 4 of the vehicle. The battery voltage is supplied via a ignition switch 3 to the ignition system of the vehicle.

The output (B terminal) voltage of the electric generator 2 is also inputted to the generator voltage regulator 1, as shown.

The external control apparatus is connected to the generator voltage regulator (referred to in the following simply as the voltage regulator) 1 of the electric generator 2 as shown, to supply a generator output restraining signal as an external control signal of the electric generator 2, which is transferred to the generator voltage regulator 1 via an input terminal C.

The voltage regulator 1 includes a voltage control circuit 11, an engine starting judgement circuit 12, an external signal judgement circuit 13, an AND gate 14 and a reference voltage changeover circuit 15. The voltage control circuit 11 includes a resistive voltage divider formed of resistors 111, 112, a voltage comparator 113, a switching transistor 114 and a current return diode 115. A reference voltage Vr that is produced from the reference voltage changeover circuit 15 is applied to the non-inverting input terminal of the voltage comparator 113, while the output voltage Vb of the resistive voltage divider formed of resistors 111, 112, i.e., a voltage proportional to the B-terminal output voltage of the electric generator 2, is applied to the inverting input terminal of the voltage comparator 113. The output terminal of the voltage comparator 113 is connected to the base electrode of the switching transistor 114, while the collector electrode of the switching transistor 114 is connected via the current return diode 115 to the B output terminal of the electric generator 2, and the emitter electrode of the switching transistor 114 is connected to ground potential via a E terminal.

The collector electrode of the switching transistor 114 is also connected to one end of the field winding 21, while the other end of the field winding 21 is connected to the B output terminal of the voltage regulator 1. Hence, when the switching transistor 114 is set in the on (i.e., conducting) state, an excitation current flows in the field winding 21. The current return diode 115 is connected between the opposing ends of the field winding 21, so that each time the switching transistor 114 is switched from the on to the off (i.e., non-conducting) state, and the excitation current flow through the field winding 21 and switching transistor 114 is thereby interrupted, a reverse current flow that is induced in the field winding 21 passes through the current return diode 115 back to the field winding 21.

The engine starting judgement circuit 12 is connected via a terminal P to one of the phase windings of the armature winding 22, and serves to detect whether engine starting is in progress. This judgement is based upon judging whether the speed of rotation of the electric generator 2 (i.e., of the rotor) has increased from zero to attain a predetermined value, with that judgement being based upon the frequency of the AC voltage produced from the armature winding 22.

When the engine starting judgement circuit 12 judges that engine starting is in progress, it supplies an output signal at a high (logic) level to one of the inputs of the AND gate 14. In addition, the external signal judgement circuit 13 judges whether a generator output restraining signal (with this embodiment, an external control signal, at the high level, which is applied to the C input terminal of the electric generator 2) is being received from the external control apparatus and supplies a high level signal to the other input of the AND gate 14 so long as the generator output restraining signal is being received.

It should be noted that although with this embodiment a generator output restraining signal consists of a high level condition of a control signal that is supplied from the external control apparatus to the electric generator 2, this is not essential. It would be equally possible for example to implement the generator output restraining signal as a first code sequence that is transmitted from the external control apparatus when engine starting begins and a second code sequence that is transmitted when the engine starting operation is ended, with the external signal judgement circuit 13 being configured to recognize these code sequences.

The reference voltage changeover circuit 15 is controlled in accordance with the combination of levels of the output signals from the AND gate 14 and the external signal judgement circuit 13, to selectively produce a reference voltage at three different values. These are a first reference voltage Vref1 which is selected during normal operation of the engine, a second reference voltage Vref2 which is lower than Vref1 and is selected during acceleration of the vehicle, and a third reference voltage Vref3 which is lower than Vref2 and is selected during engine starting.

With this embodiment, since the voltage comparator 113 performs comparison with a detection voltage Vb that is equal to the (B terminal) output voltage of the electric generator multiplied by the division ratio of the resistive voltage divider (resistors 111, 112), the reference voltage changeover circuit 15 actually supplies to the non-inverting input terminal of the voltage comparator 113 a reference voltage Vr that is equal to a selected target value of output voltage of the electric generator 2, multiplied by the division ratio of the resistive voltage divider.

The first reference voltage Vref1, selected when restraint of the generator output voltage is not being applied, would typically be set as 14.5 V, for example.

The operation of the voltage regulator 1 will be described in the following, starting from the condition in which the ignition switch 3 has been closed and the voltage regulator 1 has been set in the operating condition. At this time, before engine starting is commenced, the external control apparatus determines that restraint of the generator output voltage is not necessary, so that no generator output restraining signal is transmitted (i.e., with this embodiment, the control signal from the external control apparatus remains at the low level). In that state, low level output signals are produced from the external signal judgement circuit 13, so that low level input signals are supplied to the reference voltage changeover circuit 15 from the AND gate 14 and external signal judgement circuit 13 respectively. In response to that combination of input signals, the reference voltage changeover circuit 15 selects the first reference voltage Vref1. When engine starting is commenced, the external control apparatus may judge that generator output voltage restraint is necessary, and in that case will begin to transmit the generator output restraining signal (which with this embodiment consists of setting the external control signal supplied to the electric generator 2 at the high level). In response, the output signal from the external signal judgement circuit 13 goes to the high level.

At that time the engine starting judgement circuit 12 will detect (based on the frequency of the AC voltage generated by the armature winding 22) that engine starting is in progress, and so supplies a high level input signal to the AND gate 14. As a result of receiving two high-level input signals, the output signal from the AND gate 14 at that time, the AND gate 14 supplies a high level signal to the reference voltage changeover circuit 15. The reference voltage changeover circuit 15 is configured to respond to the combination of high level input signals from both the external signal judgement circuit 13 and AND gate 14 by selecting the third reference voltage Vref3. The switching transistor 114 in the voltage control circuit 11 is thereby controlled to regulate the output voltage of the electric generator 2 to the level determined by the reference voltage Vr3.

The third reference voltage Vref3 is substantially lower than the first reference voltage Vref1. As a result, even if a high level of current is supplied by the battery 4 during engine starting, causing the terminal voltage of the battery 4 to fall substantially, the lowering of the target output voltage of the electric generator 2 to Vref3 ensures that the level of output current from the electric generator 2 can be restrained to the necessary extent during the engine starting.

Subsequently, when the engine speed of rotation as indicated by the AC frequency output from the armature winding 22 attains a value corresponding to the completion of engine starting, as judged by the engine starting judgement circuit 12, the output signal from the engine starting judgement circuit 12 is set to the low level, so that the AND gate 14 applies a low level input signal to the reference voltage changeover circuit 15. At approximately the same time, the external control apparatus will judge that restraint of the generator output voltage is no longer required, and so will cease to transmit the generator output restraining signal. (i.e., with this embodiment, will set the external control signal to the low level).

The respective output signals from the external signal judgement circuit 13 and the AND gate 14 thereby each change to the low level. In response to this pair of low level input signals, the reference voltage changeover circuit 15 again selects a voltage corresponding to the first reference voltage Vref1 as the target value of output voltage of the electric generator 2.

Subsequently, when the engine begins to be controlled to accelerate the vehicle, the external control apparatus again begins to supply the generator output restraining signal to the electric generator 2, so that the output signal from the external signal judgement circuit 13 goes to the high level. At that time, the engine starting judgement circuit 12 will detect that the engine is in operation but running at a speed which indicates that that engine starting is not in progress, and so supplies a low level input signal to the AND gate 14. Hence, the output signal from the AND gate 14 is held at the low level. The reference voltage changeover circuit 15 is configured to respond to the specific combination of low level and high level inputs from the AND gate 14 and external signal judgement circuit 13 respectively, by selecting a voltage corresponding to the second reference voltage Vref2 as the target value of output voltage of the electric generator 2.

As a result, the switching transistor 114 in the voltage control circuit 11 is controlled to hold the output voltage of the electric generator 2 at a level determined by the Vref2 value. Since this is a lower value than the regulated output voltage (corresponding to Vref1) used during normal running of the engine, the level of output power supplied by the electric generator 2 is accordingly reduced, and hence the level of torque applied to drive the electric generator 2 by the engine is reduced and increased torque thereby becomes available for accelerating the vehicle.

When the acceleration is completed, sending of the generator output restraining signal from the external control apparatus is ended, so that the output signal from the external signal judgement circuit 13 returns to the low level, and the reference voltage changeover circuit 15 again selects the first reference voltage Vref1.

It is possible that an abnormality may arise in the connecting leads or connection terminals which transfer the generator output restraining signal from the external control apparatus to the electric generator 2, whereby inputting of that signal to the electric generator 2 is not ended. With this embodiment, such a condition would result in the C input terminal of the electric generator 2 remaining fixed at the high level. With a system in which the generator output restraining signal is transmitted as a combination of a start code subsequently followed by a termination code, as described hereinabove, such a connection abnormality could result in the external signal judgement circuit 13 failing to receive the termination code. In either case, the output signal from the external signal judgement circuit 13 would become fixed at the high level. However with the above embodiment, if such an abnormal condition occurs, the electric generator 2 will continue to operate with its output voltage being normally regulated in accordance with the first reference value Vref1, and will be regulated in accordance with the third reference value Vref3 only during each of the (short, occasional) intervals of engine starting.

This is due to the fact that even if the output signal from the external signal judgement circuit 13 become fixed at the high level, the output signal from the AND gate 14 will only attain the high level during each interval when the engine starting judgement circuit 12 judges that engine starting is occurring, and so applies a high level input signal to the AND gate 14. It can thus be reliably ensured that the reference voltage value for regulating the electric generator output voltage is set to the very low third reference voltage Vref3 only during each interval of engine starting, irrespective of any problems that may arise in supplying the generator output restraining signal from the external control apparatus. Thus the possibility of complete discharge of the battery 4, due to the generator output voltage being continuously held at an excessively low level, can be avoided.

As described above, the invention utilizes the fact that there is a fixed relationship between the speed of rotation of the vehicle engine and the speed of rotation of the rotor of the electric generator 2, which is detected by the engine starting judgement circuit 12 based on the frequency of the AC voltage produced in the armature winding 22. Each occurrence of engine starting can thereby be reliably detected, by monitoring the frequency of that AC voltage.

Second Embodiment

With a second embodiment, the engine starting judgement circuit 12 is configured to detect each engine starting interval based on the level of output voltage of the electric generator 2. That is to say, each engine starting interval is detected as commencing when the engine begins to rotate (as indicated by the frequency of the AC voltage appearing on a phase winding as described above for the first embodiment), and ending when the output voltage of the electric generator 2 reaches a predetermined value that is equal to or close to a normal operating value (determined by the first reference voltage Vref1 as described above).

With this embodiment, in addition to receiving an AC signal produced from a phase winding 22 of the AC generator, the engine starting judgement circuit 12 is supplied with the output voltage from the electric generator 2, for use in judging the level of that voltage. Alternatively, the voltage Vb appearing at the junction of the resistors 111, 112 may be supplied, i.e., to be compared with a voltage that is equal to Vref1. When commencement of generator rotation is detected, the output signal from the engine starting judgement circuit 12 goes from the low to the high level, and when the output voltage of the generator 2 subsequently rises to the predetermined value that is determined by Vref1 (or the voltage Vb becomes equal to Vref1), the output signal returns to the low level.

In other respects, the operation and configuration of this embodiment are identical to those of the first embodiment described above.

Third Embodiment

With the above embodiments, at a time point when the generator output restraining signal ceases to be transmitted to the electric generator 2, at the end of an engine starting operation (i.e., a time point at which the reference voltage changeover circuit 15 begins to receive a low level input signal from the external signal judgement circuit 13) the target value of generator output voltage is changed from that determined by the lowest (third) reference voltage Vref3 to that determined by the normal (first) reference voltage Vref1.

With a third embodiment, which is a modified form of the second embodiment above, when the interval of regulating the generator output voltage in accordance with the third reference voltage Vref1 is ended (e.g., when the external control apparatus 7 determines that driving of the starter motor has ended), the external control apparatus 7 begins to transmit the generator output restraining signal intermittently rather than continuously. That is to say, the external control apparatus 7 successively alternates between transmitting and ceasing to transmit that signal. By performing this in an appropriate time axis pattern, after the output voltage of the electric generator 2 has become regulated to the third reference voltage Vref3, that output voltage gradually returns towards the level of the first reference voltage Vref1.

That is to say, each time that supplying of the generator output restraining signal is interrupted, the output signal from the external signal judgement circuit 13 goes to the low level, so that the reference voltage changeover circuit 15 will temporarily select the first reference voltage Vref1, while each time that supplying of the generator output restraining signal is restored, the output signal from the external signal judgement circuit 13 goes to the high level, so that (with the output signal from the engine starting judgement circuit 12 still at the high level) the reference voltage changeover circuit 15 will temporarily select the third reference voltage Vref3 as described hereinabove.

It can thus be understood that by using an appropriate time axis pattern of such successive changeovers to/from the condition of supplying the generator output restraining signal, the output voltage of the electric generator 2 can be made to smoothly increase to the normal level, at the end of an engine starting operation.

After a predetermined duration of such on/off supplying of the generator output restraining signal has elapsed (i.e., sufficient for the generator output voltage to have returned to the normal level) transmitting of that signal is ended.

Fourth Embodiment

With the first embodiment described above, during an engine starting operation, the very low third reference voltage Vref3 will cease to be selected by the reference voltage changeover circuit 15 when either:

(a) the output signal from the engine starting judgement circuit 12 returns to the low level (i.e., that circuit judges that engine starting has been completed), even if the generator output restraining signal is still being transmitted from the external control apparatus, or (b) the external control apparatus ceases to send the generator output restraining signal.

However with a fourth embodiment, the voltage regulator 1 is configured such that Vref3 ceases to be selected by the reference voltage changeover circuit 15 at the point when the external control apparatus terminates sending the generator output restraining signal (so that the output signal from the external signal judgement circuit 13 returns to the low level), irrespective of the state of the output signal from the engine starting judgement circuit 12.

Such a configuration may be advantageous in that the external control apparatus can more freely determine (in accordance with the electrical load that is being supplied by the electric generator 2, the engine condition, etc.,)the duration of each interval for which the electric generator output voltage is regulated to the lowest value, when engine starting is performed.

Figure 2:
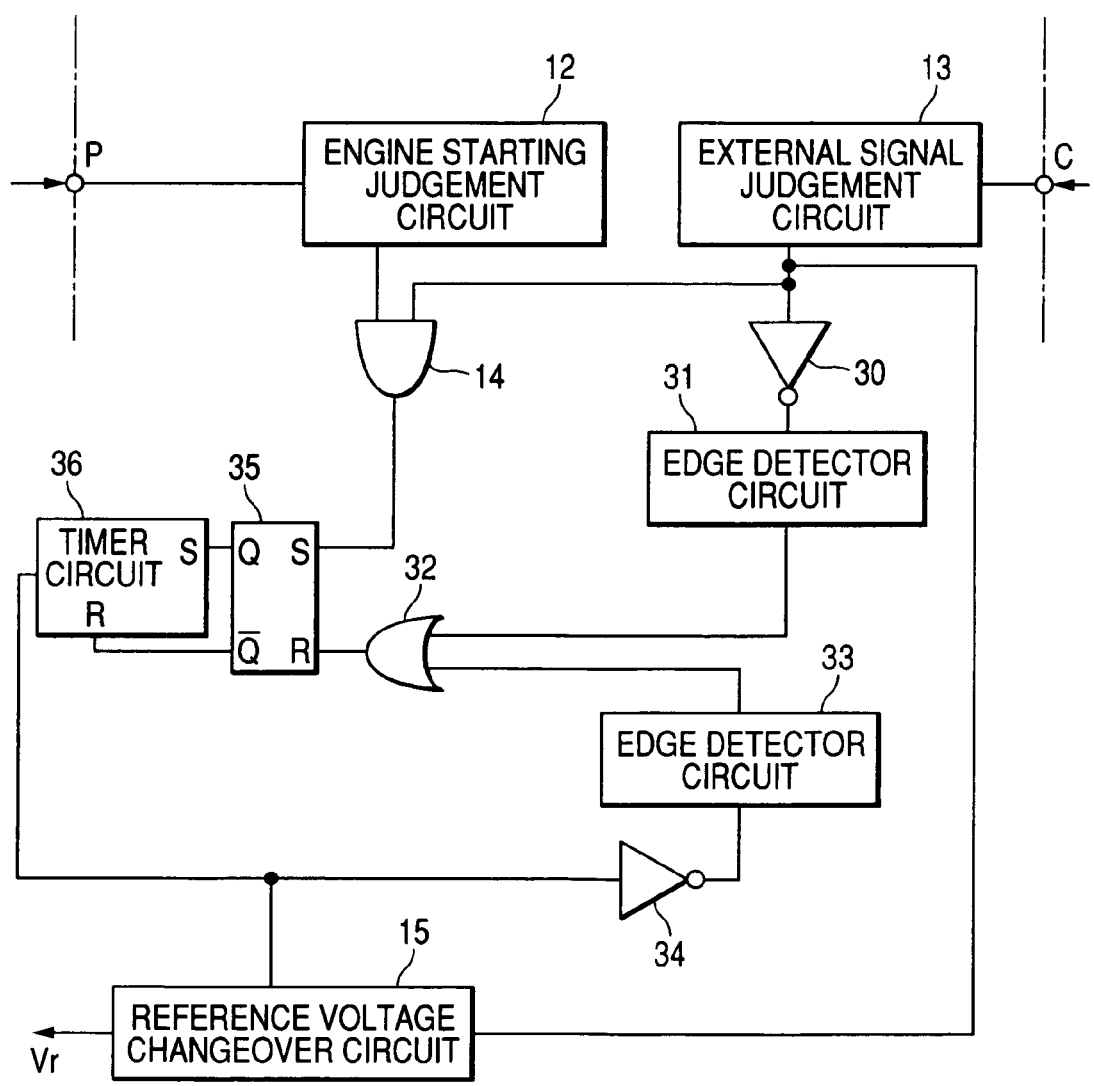
FIG. 2 is a partial circuit diagram of a voltage regulator circuit in a fourth embodiment of a generator voltage regulator.

This can be achieved for example by modifying the voltage regulator 1 of FIG. 1 to the form shown in the partial circuit diagram of FIG. 2. In this case, the output signal from the AND gate 12 is applied to the S (set) terminal of a latch circuit, which in this example is a R-S flip-flop 35. The output signal from the external signal judgement circuit 13, in addition to being inputted to the engine starting judgement circuit 12 and to the reference voltage changeover circuit 15 in the same manner as for the circuit of FIG. 1, is also applied via an inverter 30 to an edge detector circuit 31, which produces a short-duration high level pulse when its input signal changes from the low to the high level. The output from the edge detector circuit 31 is applied to one input of a 2-input OR gate 32, whose output is connected to the R (reset) terminal of the R-S flip-flop 35. The output signal from the Q terminal of the R-S flip-flop 35 is inputted to an activation terminal (indicated as the S terminal) of a timer circuit 36, whose output signal is inputted to the reference voltage changeover circuit 15 (in place of the output signal from the AND gate 14 in the circuit of FIG. 1). The output signal from the timer circuit 36 is also applied via an inverter 34 to an edge detector circuit 33, whose output is applied to the other input of the OR gate 32.

Only the points of difference between this circuit and that of FIG. 1 will be described. Each of the engine starting judgement circuit 12, external signal judgement circuit 13 and reference voltage changeover circuit 15 operate as described for the first embodiment. With the circuit of FIG. 2, when the external signal judgement circuit 13 detects that the generator output restraining signal is being supplied, and thereby applies a high level input to the AND gate 14, then if the external signal judgement circuit 13 detects that engine starting is in progress, a high level output signal will be produced by the AND gate 14, as for the first embodiment. This signal sets the R-S flip-flop 35, which thereby activates the timer circuit 36 to apply a high level input signal to the reference voltage changeover circuit 15. Since at that time a high level input is also being applied to the reference voltage changeover circuit 15 from the external signal judgement circuit 13, the reference voltage changeover circuit 15 will select the third reference voltage Vref3, as described for the first embodiment.

Thereafter, irrespective of whether the output signal from the engine starting judgement circuit 12 returns to the low level, the reference voltage changeover circuit 15 will continue to select the third reference voltage Vref3, until transmitting of the generator output restraining signal is ended.

When that occurs, so that the output signal of the external signal judgement circuit 13 returns to the low level, a reset signal is applied from the edge detector circuit 31 through the OR gate 32 to the R-S flip-flop 35. The inverse (not-Q) output signal from the R-S flip-flop 35 thereby resets the timer circuit 36. In this condition, low level signals are being supplied to the reference voltage changeover circuit 15 from the timer circuit 36 and the external signal judgement circuit 13, so that the first reference voltage Vref1 become selected by the reference voltage changeover circuit 15. The output voltage of the electric generator 2 thereby becomes regulated to the normal operating level.

In that way, the external control apparatus 7 can arbitrarily control the duration of each interval for which restraint is applied to the generator output voltage during engine starting, while maintaining the advantages described for the first embodiment.

If an abnormality occurs whereby the output signal from the external signal judgement circuit 13 becomes fixed at the high level, then after the engine starting judgement circuit 12 detects that engine starting has commenced, so that the output from the AND gate 14 goes to the high level, the R-S flip-flop 35 will become set as described above, so that in this condition, the third reference voltage Vref3 will be selected by the reference voltage changeover circuit 15. Subsequently, when time-out occurs for the timer circuit 36, so that it becomes reset and its output signal returns to the low level, a high level pulse will be applied from the edge detector circuit 33 through the OR gate 32 to the R terminal of the R-S flip-flop 35, which is thereby reset.

In this condition, if the reference voltage changeover circuit 15 is configured as described for the first embodiment, the second reference voltage Vref2 will be selected by the reference voltage changeover circuit 15, i.e., the lowest reference voltage (Vref3) will no longer be selected. Hence, even if the output signal from the external signal judgement circuit 13 becomes fixed at the high level due to some abnormality, it can be ensured that the reference voltage changeover circuit 15 will regulate the output voltage of the electric generator 2 to the lowest value only during each short interval of engine starting.

With the first embodiment described above, the (B-terminal) output voltage from the electric generator 2 is compared with the reference voltage generated by the reference voltage changeover circuit 15, to thereby control the switching transistor 114 of the voltage control circuit 11 to regulate the output voltage of the electric generator 2. However it would be equally possible to instead provide a dedicated connecting lead between the positive terminal of the battery 4 and the voltage control circuit 11 (specifically, the upper end of the resistive voltage divider formed of resistors 111, 112 in FIG. 1), so that the terminal voltage of the battery 4 is regulated to the reference voltage that is selected by the reference voltage changeover circuit 15.

It should thus be noted that the invention is not limited to the embodiments described above, and that various modifications, combinations, or alternative configurations of these could be envisaged, which fall within the scope set out in the appended claims. In particular, the invention is not limited to any specific method for the generator apparatus to detect occurrence of an engine starting interval, and that other methods than those described (for example, based on monitoring the amplitude of generated AC voltage of a phase winding) could be envisaged.

What is claimed is:

1. A voltage control apparatus for installation on a motor vehicle, said motor vehicle incorporating an electric generator that is driven by an engine of said vehicle and a battery which is charged by a current supplied from said electric generator, said voltage control apparatus comprising a voltage control circuit for maintaining an output voltage of said electric generator or a terminal voltage of said battery at a regulated voltage, and said voltage control apparatus being coupled to receive an external signal that is transmitted from an external control apparatus for designating that said regulated voltage is to be made lower than a predetermined first regulated value;

wherein said voltage control apparatus comprises:
an engine starting judgement circuit for detecting occurrence of an engine starting interval;
an external signal judgement circuit for detecting when said external signal is being received from said external control apparatus; and
a regulated voltage changeover circuit responsive to respective output signals from said engine starting judgement circuit and said external signal judgement circuit, for changing said regulated voltage from said first regulated value to a second regulated value that is lower than said first regulated value, when said external signal judgement circuit detects that said external signal is being received and said engine starting judgement circuit does not detect said engine starting interval, and for changing said regulated voltage to a third regulated value that is lower than said second regulated value, when said external signal judgement circuit detects that said external signal is being received and said engine starting judgement circuit concurrently detects occurrence of said engine starting interval.

2. A voltage control apparatus according to claim 1, wherein said engine starting judgement circuit detects said engine starting interval as an interval in which a speed of rotation of a rotor of said electric generator is below a predetermined value.

3. A voltage control apparatus according to claim 2, wherein said electric generator comprises an AC generator apparatus incorporating said rotor, and wherein said engine starting judgement circuit detects said speed of rotation based upon a frequency of an AC voltage produced by said AC generator apparatus.

4. A voltage control apparatus according to claim 1, wherein said engine starting judgement circuit detects said engine starting interval as an interval extending from commencement of rotation of said rotor until said output voltage of said electric generator attains a predetermined value.

5. A voltage control apparatus according to claim 4, wherein said external control apparatus initiates transmitting said external signal upon commencement of an engine starting operation and wherein following termination of said engine starting operation, said external control apparatus alternately transmits and ceases to transmit said external signal during respective successive intervals, in a predetermined time-axis pattern, until said output voltage of said electric generator attains said predetermined value.

6. A voltage control apparatus according to claim 1 wherein after said engine starting judgement circuit has detected said engine starting interval concurrently with said external signal judgement circuit detecting that said external signal is being received, said regulated voltage changeover circuit subsequently terminates said setting of said regulated voltage to said third regulated value, at a time point when said external signal judgement circuit detects that said external signal has ceased to be received, irrespective of a detection condition of said engine starting judgement circuit.

7. A voltage control apparatus according to claim 6 comprising:

a latch circuit that is adapted to become set when said engine starting judgement circuit detects said engine starting interval concurrent with said external signal judgement circuit detecting that said external signal is being received, and is adapted to become reset when said external signal judgement circuit ceases to detect that said external signal is being received; and a timer circuit that is adapted to become set when said latch circuit becomes set, and to become reset when said latch circuit becomes reset;

wherein said regulated voltage changeover means sets said regulated voltage at said third regulated value only under a condition in which said timer circuit is set, concurrent with said external signal judgement circuit detecting that said external signal is being received.

8. A voltage control apparatus according to claim 1, wherein said external signal is a power generation control signal.

* * * * *